(Model.)
G. W. EVANS.
MILK AND CREAM CAN.
No. 274,745. Patented Mar. 27, 1883.
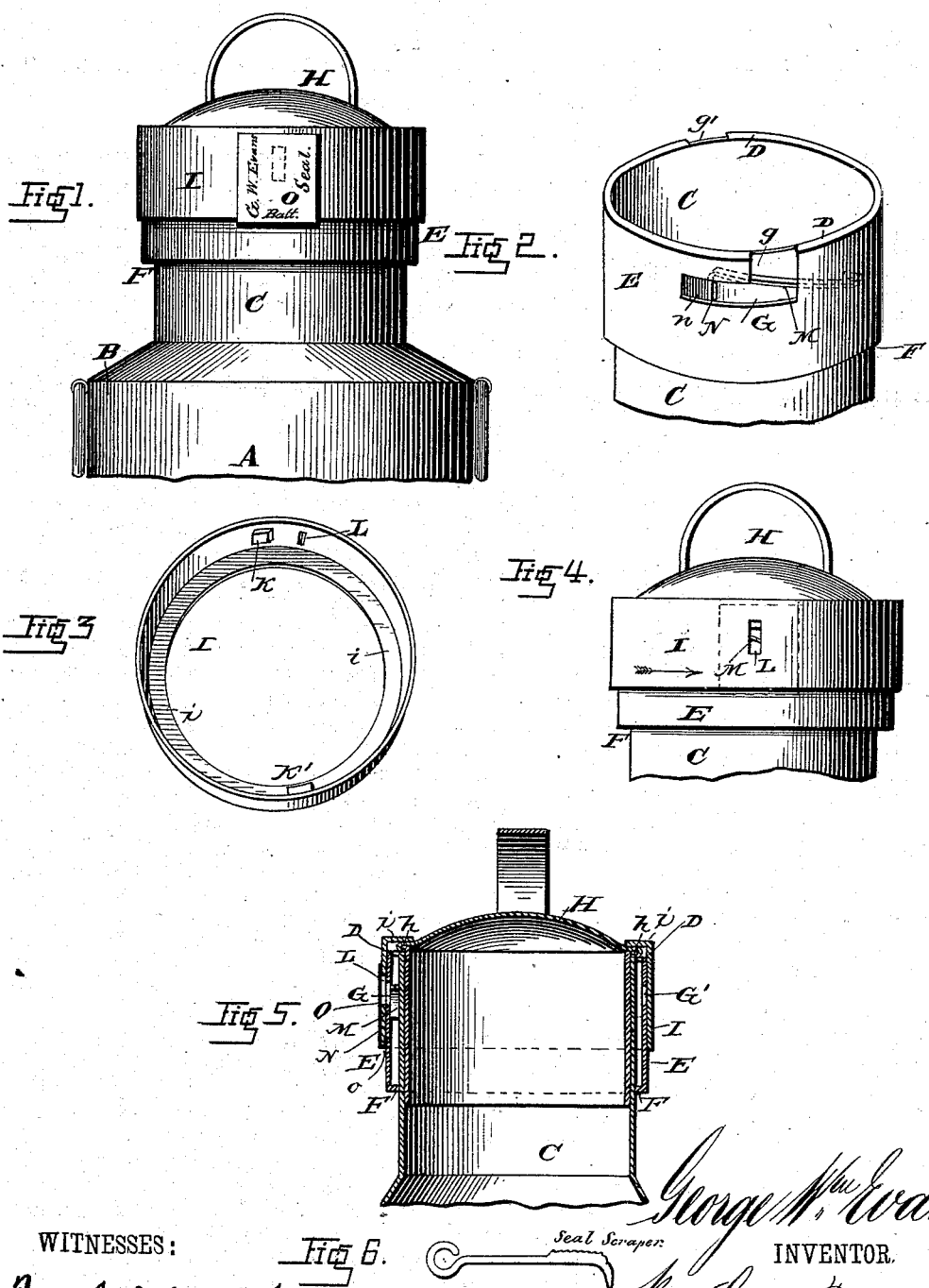

UNITED STATES PATENT OFFICE.

GEORGE W. EVANS, OF BALTIMORE, MARYLAND.

MILK AND CREAM CAN.

SPECIFICATION forming part of Letters Patent No. 274,745, dated March 27, 1883.

Application filed February 10, 1883. (Model.)

*To all whom it may concern:*

Be it known that I, GEORGE WM. EVANS, of Baltimore, in the county of Baltimore and State of Maryland, have invented certain new and useful Improvements in Milk and Cream Cans; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of the top part of one of my improved milk and cream cans locked, sealed, and ready for transportation or shipment. Fig. 2 is a perspective view of the top of can with the cover and seal-collar removed. Fig. 3 is a view of the seal-collar in an inverted position to show the inside catch-lugs. Fig. 4 is a detail view of the top of the can, with its cover and collar locked, but before applying the seal. Fig. 5 is a vertical sectional view through the cover, collar, and neck of can; and Fig. 6 is a view of one form of the key used to break the seal and open the can.

Similar letters of reference indicate corresponding parts in all the figures.

In shipping milk or cream by railroad, steamboat, or other public conveyances from the producer to the dairyman, by whom it is again retailed and distributed among the consumers, the cans containing the milk or cream are frequently tampered with by unscrupulous employés of the transportation-lines, who abstract part of the contents of the cans, and sometimes, to conceal the theft, fill up with water or skim-milk. Thus the product reaches the wholesale dealer either reduced in quantity more or less, or in an adulterated state, for which he is usually held responsible by the consumers or other dealers whom he supplies.

It is the object of my invention to overcome this serious loss and annoyance by the construction of a milk or cream can in which the cover is locked to the body of the can in such a manner that the can cannot be tampered with for the purpose of removing or diluting its contents without breaking a seal in order to get access to a peculiarly-constructed fastening device which must be unlocked before the cover can be removed or even displaced.

The detailed construction of my improved can will readily be understood by reference to the accompanying drawings, in which—

A denotes the body, B the breast, and C the neck, of the can, which may be of any desired size. The top or mouth of the neck is turned down to form a flange, D, to which is soldered the upper rim of a collar, E, the lower rim of which is turned in against the rim to form the flange F. The upper part of the collar E is cut out to form horizontal slots or openings G and G', having vertical branch openings g g', in a line with which flange D is cut away to afford access to the slots or openings from the top of the can.

The cover (shown at H) has a circular flange, h, which, when it is in position, rests upon flange D of the can, and is clamped between said flange and the flange i of the sealing-collar I. The latter is of such a size that it will fit snugly upon the fixed band or collar E, and has on its inside two projecting lugs, K and K', of such size and shape that they will fit into the elbow-slots G g and G' g', respectively. It also has a narrow vertical slot, L, at one side of the catch-lug K. In the narrow annular space between the neck C and fixed collar E is arranged a spring, M, the free end of which is bent down to form a lip, N, leaving an opening or open space, n, between said lip and the end of the slot of such a size that the catch-lug K may be sprung into it by depressing the fixed arm of the spring in turning collar I into position for locking the cover to the can. In this locked position of the collar its narrow slot L will come opposite to the outer end of spring M, where this is bent to form the lock-lip, as shown in Fig. 4 of the drawings, and by inserting the bit of the key shown in Fig. 6 through this slot or key-hole, pressing down upon the spring, the free end of this will be depressed, so as to disengage the catch-lug K, when collar I may be turned in the direction of the arrow until it reaches the opening g, in which position the lug K' on the opposite side of the collar will have reached the slot or opening g' on the opposite side of the can, so that sleeve I can be readily taken off, which releases or unlocks cover H, when the can may be opened in the usual manner.

To prevent tampering with the lock-spring M N, I cover the key-hole L with an adhesive seal, (shown at O in Figs. 1 and 5,) so that the key can only be inserted into the key-hole by breaking the seal. To prevent this from being removed surreptitiously, its lower end may be doubled in under the lower rim of the seal-collar I, as shown at $o$ in Fig. 5, and to this end that part of the collar may be struck up or countersunk for the purpose of making room for the doubled portion of the seal.

In practice it is expedient to so construct the railway-tickets used for shipping the cans, and one of which is usually attached to each can, that these will answer the purposes of the seal, so that they will be canceled by opening the can after it has arrived at its destination. This prevents fraud by reuse of tickets by detaching them from the cans, which may easily be done (as, as a matter of fact, is frequently done) when the ticket is simply tied to the can. I propose to make this system of ticketing milk-cans the subject of a separate application.

Having thus described my invention, I claim and desire to secure by Letters Patent of the United States—

1. In a milk or cream can, the flanged neck C, having the fixed band or collar E, slotted at G $g$ G′ $g'$, and lock-spring M N, fixed in the annular space between the neck and collar, substantially as and for the purpose shown and set forth.

2. The removable sealing-collar I, adapted to fit the fixed band or collar E of the can, and having flange $i$, inside lugs, K and K′, and key-hole L, substantially as and for the purpose shown and set forth.

3. The combination of the milk-can having the slotted neck-band or collar E and lock-spring M N, arranged as described, cover H, having flange $h$, and seal-collar I, adapted to fit over collar E, and having catch-lugs K K′, flange $i$, and key-hole L, substantially as and for the purpose herein shown and set forth.

In testimony that I claim the foregoing as my own I have hereunto affixed my signature in presence of two witnesses.

GEORGE WM. EVANS.

Witnesses:
AUGUST PETERSON,
LOUIS BAGGER.